United States Patent
Christie

(10) Patent No.: US 10,862,712 B1
(45) Date of Patent: Dec. 8, 2020

(54) BATTERY-ASSISTED POWER-OVER-ETHERNET POWERED DEVICE

(71) Applicant: Savant Systems, Inc., Hyannis, MA (US)

(72) Inventor: Cary L. Christie, Gardnerville, NV (US)

(73) Assignee: Savant Systems, Inc., Hyannis, MA (US)

( * ) Notice: Subject to any disclaimer, the term of this patent is extended or adjusted under 35 U.S.C. 154(b) by 0 days.

(21) Appl. No.: 16/442,987

(22) Filed: Jun. 17, 2019

(51) Int. Cl.
*H04L 25/02* (2006.01)
*G05F 1/10* (2006.01)
(Continued)

(52) U.S. Cl.
CPC ............... *H04L 25/02* (2013.01); *G05F 1/10* (2013.01); *G06F 1/263* (2013.01); *H04L 12/10* (2013.01)

(58) Field of Classification Search
CPC ...... E06B 9/42; E06B 9/68; E06B 9/72; F21S 9/02; G05F 1/10; G05F 1/46; G06F 1/26; G06F 1/263; G06F 1/32; G06F 1/3212; G06F 1/3296; G06F 11/2015; G06F 13/385; H02J 9/06; H02J 1/10; H02J 1/08; H02J 7/00; H02J 7/02; H02J 7/0068; H02J 13/0016; H02J 13/0062; H04L 1/22; H04L 12/10; H04L 12/24; H04L 12/26; H04L 12/28; H04L 25/02; H04L 12/28; H04L 12/2881; H04L 12/40045; H04L 12/40189; H04L 41/0672;
(Continued)

(56) References Cited

U.S. PATENT DOCUMENTS

| 7,941,677 B2 | 5/2011 | Penning |
| 8,214,680 B1 * | 7/2012 | Tassinari ................. H04L 12/10 713/330 |

(Continued)

FOREIGN PATENT DOCUMENTS

| WO | WO-2017/062995 A1 | 4/2017 |
| WO | WO-2020/086204 A1 | 4/2020 |

OTHER PUBLICATIONS

"IP POE Powered Ceiling Speaker IP-600POE," CMX, CMX Audio, Apr. 24, 2015, pp. 1-3.
(Continued)

*Primary Examiner* — Gerald Gauthier
(74) *Attorney, Agent, or Firm* — Cesari and McKenna, LLP; James A. Blanchette

(57) ABSTRACT

In various example embodiments, a battery-assisted PoE powered device is provided that includes a local battery pack for providing a burst of power to a device load in excess of the continuous power available via PoE. A charger/path controller charges the local battery pack during periods of time when the device load consumes less power than available via PoE (e.g., consumes less than the 71W of guaranteed continuous power under IEEE 802.3bt). During periods of time when the device load demands more power than available via PoE (e.g., when peak power is demanded by an audio speaker, when inrush occurs in a motor, or for various types of intermittent devices when they are activated) the charger/path controller discharges the battery pack, to drive the device load with a combination of PoE and battery power.

25 Claims, 2 Drawing Sheets

(51) Int. Cl.
*H04L 12/10* (2006.01)
*G06F 1/26* (2006.01)

(58) Field of Classification Search
CPC . H04R 9/02; H04R 3/00; H05B 37/02; H05B 45/10; H05B 47/185; B60R 16/03; F15B 15/10; G05B 19/06; H03F 3/185; H04B 3/54; H04N 5/23206; H04N 21/4436
USPC ............ 307/11, 23, 64, 65, 66, 80; 320/137, 320/108; 370/216, 352; 379/413; 713/300, 310, 340; 340/10.1; 381/150; 700/297
See application file for complete search history.

(56) References Cited

U.S. PATENT DOCUMENTS

| | | | |
|---|---|---|---|
| 8,873,370 B2* | 10/2014 | Robitaille | G06F 1/266 370/216 |
| 9,377,794 B1* | 6/2016 | Dwelley | G05F 1/462 |
| 10,749,375 B2* | 8/2020 | Kanarellis | H02J 7/007 |
| 2006/0186739 A1* | 8/2006 | Grolnic | G06F 1/30 307/64 |
| 2006/0263925 A1 | 11/2006 | Chandler | |
| 2008/0168283 A1* | 7/2008 | Penning | G06F 1/263 713/310 |
| 2008/0175227 A1* | 7/2008 | Moore | G06F 1/324 370/352 |
| 2008/0250255 A1* | 10/2008 | Diab | G06F 1/26 713/300 |
| 2009/0243391 A1* | 10/2009 | Susong, III | H02J 9/061 307/66 |
| 2010/0223480 A1* | 9/2010 | Fratti | H04L 12/10 713/300 |
| 2010/0244573 A1* | 9/2010 | Karnick | H02J 7/34 307/80 |
| 2011/0115430 A1* | 5/2011 | Saunamaki | H02J 50/50 320/108 |
| 2011/0133551 A1* | 6/2011 | Moller | G06F 1/266 307/11 |
| 2012/0200157 A1* | 8/2012 | Ohi | H02J 3/32 307/23 |
| 2012/0271477 A1* | 10/2012 | Okubo | H04L 12/10 700/297 |
| 2013/0169050 A1* | 7/2013 | Tseng | H04L 12/10 307/65 |
| 2014/0167918 A1* | 6/2014 | Stern | G06K 7/10009 340/10.1 |
| 2014/0270235 A1 | 9/2014 | Shin et al. | |
| 2015/0177800 A1* | 6/2015 | Kanan | H04L 12/40045 713/300 |
| 2015/0180276 A1* | 6/2015 | Kanarellis | H02J 9/061 307/66 |
| 2015/0237424 A1* | 8/2015 | Wilker | H04R 3/04 381/150 |
| 2015/0312048 A1* | 10/2015 | Bodo | H04L 43/0817 713/300 |
| 2016/0006242 A1* | 1/2016 | Yamada | H02M 7/04 307/65 |
| 2016/0064938 A1* | 3/2016 | Balasubramanian | H04L 12/10 307/11 |
| 2016/0197732 A1* | 7/2016 | Burnett | H02J 7/007 320/137 |
| 2016/0273722 A1* | 9/2016 | Crenshaw | H02J 7/0021 |
| 2016/0294184 A1* | 10/2016 | Al-Atat | F15B 15/10 |
| 2016/0349829 A1* | 12/2016 | Spiel | G06F 1/3212 |
| 2017/0026188 A1* | 1/2017 | Herzel | H04L 12/10 |
| 2017/0046289 A1* | 2/2017 | Hundal | G06F 13/4022 |
| 2017/0104603 A1* | 4/2017 | Chen | H03F 3/185 |
| 2017/0250828 A1* | 8/2017 | Buchanan | H04L 12/10 |
| 2017/0356243 A1* | 12/2017 | Feldstein | E06B 9/68 |
| 2018/0013319 A1* | 1/2018 | Kanarellis | H02J 9/00 |
| 2018/0035518 A1* | 2/2018 | Cook | H04L 12/2816 |
| 2018/0054083 A1* | 2/2018 | Hick | H02J 9/065 |
| 2018/0054347 A1* | 2/2018 | Kojima | H04L 12/44 |
| 2018/0219635 A1* | 8/2018 | Sipes, Jr. | H04B 10/077 |
| 2018/0220237 A1* | 8/2018 | Tabatabai | H04L 12/10 |
| 2018/0228007 A1* | 8/2018 | Siefer | H02J 7/0068 |
| 2018/0235055 A1* | 8/2018 | Yadav | H02J 1/00 |
| 2018/0294982 A1* | 10/2018 | Boemi | H01R 25/006 |
| 2019/0013696 A1* | 1/2019 | Kanarellis | H04L 12/10 |
| 2019/0081805 A1* | 3/2019 | Frezza | H04L 12/10 |
| 2019/0116104 A1* | 4/2019 | Mei | H04L 43/14 |
| 2019/0165575 A1* | 5/2019 | Long | G06F 1/263 |
| 2019/0212797 A1* | 7/2019 | Karidis | G06F 1/263 |
| 2019/0235600 A1* | 8/2019 | Staude | G06F 1/3212 |
| 2019/0278347 A1* | 9/2019 | Goergen | G06F 1/266 |
| 2019/0297710 A1* | 9/2019 | Crenshaw | H02J 9/061 |
| 2019/0301241 A1* | 10/2019 | Campagna | E06B 9/72 |
| 2019/0312741 A1* | 10/2019 | Chen | H03F 3/185 |
| 2020/0092052 A1* | 3/2020 | MacAfee | H04L 12/10 |
| 2020/0145495 A1* | 5/2020 | Coffey | H04L 67/125 |
| 2020/0235607 A1* | 7/2020 | Kanarellis | G06F 13/4068 |

OTHER PUBLICATIONS

"Notification of Transmittal of the International Search Report and the Written Opinion of the International Searching Authority, or the Declaration," International Filing Date: Jun. 16, 2020, International Application No. PCT/US2020/037857, Applicant: Savant Systems, Inc., dated Sep. 15, 2020, pp. 1-13.

* cited by examiner

BATTERY-ASSISTED POWER-OVER-ETHERNET POWERED DEVICE

BACKGROUND

Technical Field

The present disclosure relates generally to audio, video and automation devices in and about residential and commercial structures, and more specifically to Power-over-Ethernet (PoE) powered devices.

Background Information

PoE is becoming an increasingly popular method of powering audio devices (e.g., speakers, amplifiers, receivers, etc.), video device (e.g., televisions, monitors, video decoders. etc.), automation devices (e.g., controllers, cameras, door locks, lighting devices, motor-actuated devices, etc.) and other types of powered devices in and about residential and commercial structures. Using PoE technology, power sourcing equipment (PSE), such as a PoE switch, delivers both power and data to a powered device over twisted pair Ethernet cabling (e.g., Cat 5 cabling, Cat 6 cabling, etc.). Providing both power and data over Ethernet cabling can greatly simply wiring installation and save cost. Different PoE standards have been released by the Institute of Electrical and Electronic Engineers (IEEE) to regulate the amount of power delivered to powered devices. These standards include IEEE 802.3af, 802.3at and 802.3bt. IEEE 802af was the first PoE standard, being introduced in 2003. It provided 12.95-15.4 watts (W) of continuous power per port, which at the time was sufficient for the capabilities of powered devices.

However, as technology developed, many devices demanded more power. For that reason, IEEE 802.3at was released in 2009, which specified 25-30 W of continuous power per port. However, again new technology demanded more power. In 2018, IEEE 802.3bt was developed, which further increased continuous power per port to 51 W-100 W, depending on the variant. One variant of IEEE 802.3bt, referred to as Type 3 PoE, can carry up to 60 W of continuous power per port, with a minimum ensured continuous power on each port of 51 W. Another variant of IEEE 802.3bt, referred to as Type 4 PoE, can carry up to 100 W of continuous power per port, with a minimum ensured continuous power on each port of 71 W.

While the 71 W of ensured continuous power of Type 4 PoE is an improvement over past standards, even at its time of release it is insufficient for some devices that could benefit from PoE technology. For example, some audio device, such as speakers, may have a peak power requirement that exceeds 71 W at the highs in the audio waveform. Likewise, some home automation devices, such as motor-actuated devices, may draw inrush current that exceeds 71 W when energized. In general, audio, video, home automation devices and other devices may require large amounts of power during at least some periods of their operation. As technology progresses, it is likely more and more devices will demand more power, causing Type 4 PoE to lose its viability, much like its predecessors.

While additional standards may be developed to supersede IEEE 802.3bt, that provide more than 71 W of ensured continuous power, ever increasing standards are not a long term solution. As technology marches forward, power demands are likely to go up and up, while there are theoretical limits on how much continuous power can be passed over Ethernet cabling. At some point, new standards will be unable to further increase continuous power that can be sent over Ethernet cabling. While other cabling may support greater continuous power, there is a massive pre-installed base of legacy cabling, and installers are familiar with its installation procedures. Accordingly, shifting to a new cabling technology may not be a desirable solution.

Accordingly, there is a need for new techniques for addressing the power requirements of PoE powered devices, that can address the problem in a different way.

SUMMARY

In various example embodiments, a battery-assisted PoE powered device is provided that includes a local battery pack for providing a burst of power to a device load in excess of the continuous power available via PoE. A charger/path controller charges the local battery pack during periods of time when the device load consumes less power than available via PoE (e.g., consumes less than the 71 W of guaranteed continuous power under IEEE 802.3bt). During periods of time when the device load demands more power than available via PoE (e.g., when peak power is demanded by an audio speaker, when inrush occurs in a motor, or for various types of intermittent devices when they are activated) the charger/path controller discharges the battery pack, to drive the device load with a combination of PoE and battery power. The charger/path controller may monitor battery charge level, and upon reaching a charge threshold, throttle power consumption of the device load (such that the powered device provides a reduced-level of functionality) or deactivate the device load completely (such that functionality is temporarily suspended) to allow the local battery pack to recharge. With proper battery pack sizing, the battery-assisted PoE powered device may provide high power levels in the vast majority of typical use cases, with functionality reductions/deactivations only occurring under atypical use.

In one example embodiment, a battery-assisted PoE powered device includes at least a port configured to receive an Ethernet cable via which PoE is provided, a local battery pack including one or more cells, a device load configured to consume power to provide functionality of the powered device, and a charger/path controller. The consumed power may sometimes exceed an amount of power available via PoE. The charger/path controller may charge the local battery pack during periods of time when the device load consumes less power than the amount available via PoE, and discharge the local battery pack and drive the device load with a combination of PoE and battery power from the local battery pack during periods of time when the device load demands more power than the amount of power available via PoE.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Figure 1:
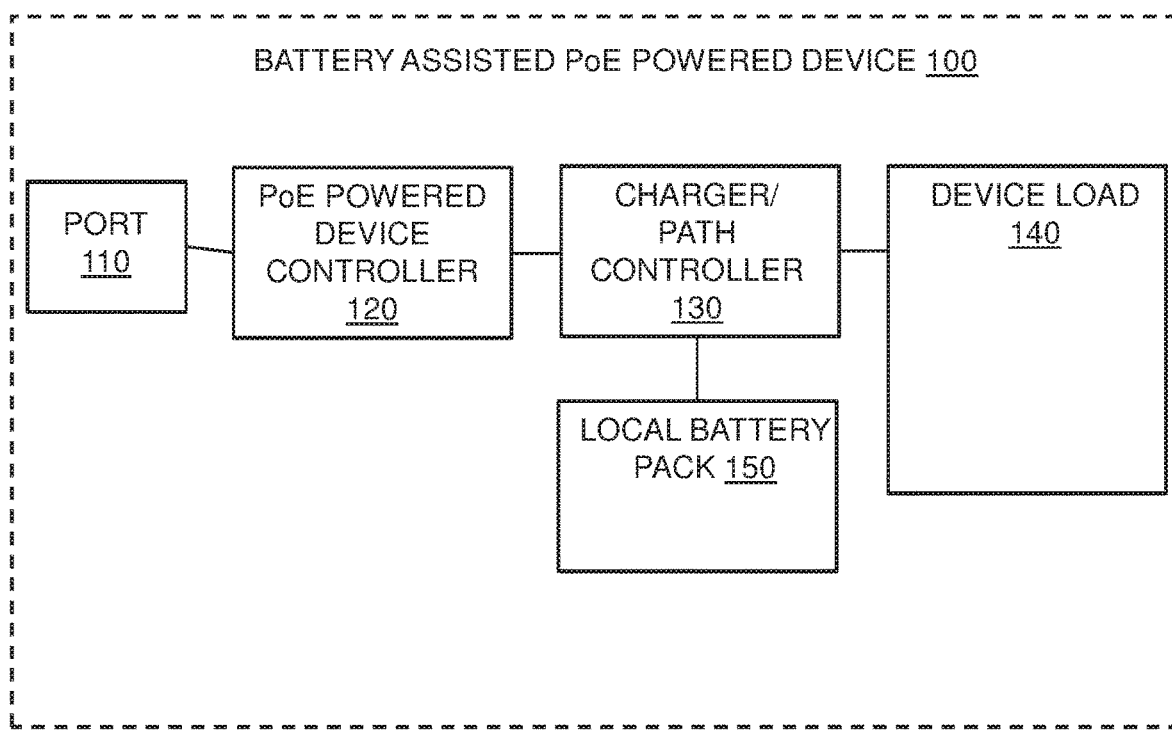
FIG. 1 is a block diagram of an example battery-assisted PoE powered device.

FIG. 1 is a block diagram of an example battery-assisted PoE powered device 100. The battery-assisted PoE powered device 100 may be an audio device, a video device, an automation device or another type of powered device in or about a residential or commercial structure. In one example embodiment, the battery-assisted PoE powered device 100 is a powered speaker, for example, an in-wall or in-ceiling powered speaker, where a body of the device is substantially disposed within a wall or ceiling cavity. In another example embodiment, the battery-assisted PoE powered device 100 is a motor-actuated device. It should be understood that a wide variety of other embodiments are possible.

The battery-assisted PoE powered device 100 includes a port (e.g., a RJ-45 port) 110 configured to receive an Ethernet cable (e.g., a Cat 5 cable, a Cat 6 cable, etc.) via which PoE is provided. A PoE powered device controller 120 is coupled to the port. The PoE powered device controller 120 is responsible for communicating with a PSE that provides the power, exchanging signature and classification information in accordance with a standard, so that the PSE provides the right amount of power over the Ethernet cable. In one embodiment, the standard is IEEE 802.3bt and the amount of power is up to 71 W of guaranteed continuous power. The PoE powered device controller 120 may include an integrated dc-to-dc converter.

The PoE powered device controller 120 is coupled to a charger/path controller 130 (the details of which are discussed further below), which is in turn coupled to a device load 140 and a local battery pack 150. The device load 140 is configured to consume power to provide functionality of the battery-assisted PoE powered device 100. Depending on the nature of the battery-assisted PoE powered device 100, the device load 140 and the functionality it provides may take many forms. For instance, in an example embodiment where the battery-assisted PoE powered device 100 is a powered speaker, the device load 140 may include one or more built-in amplifiers that amplify a low-level audio signal, or portion thereof, to a power level sufficient to run a driver (not shown) coupled to speaker cone, to provide the functionality of playing audio. The low-level audio single may be provided over the Ethernet cable, or otherwise provided to the powered speaker. Likewise, in an example embodiment where the battery-assisted PoE powered device 100 is a motor-actuated device, the device load 140 may include a motor and the functionality may be to actuate some object in or about the residential or commercial structure (e.g., open a window blind, close a door, etc.). It should be understood that a wide variety of other type of device loads 140 are possible.

The device load 140 may have power consumption that sometimes exceeds the amount of power available via PoE. For example, in the case of IEEE 802.3bt, the device load may sometimes consume more than 71 W. Such higher power consumption may be due to any of a number of reasons. For instance, in an example embodiment where the battery-assisted PoE powered device 100 is a powered speaker, a built-in amplifier may have a peak power requirement that exceeds the amount of power available via PoE at the highs in the audio waveform. As a rule of thumb, audio may be assumed to have a peak power requirement that is about eight times larger (referred to as a "crest factor") than and average power requirement, with the exact crest factor depending on the actual audio content. While the average power requirement of a powered speaker may be below the amount of continuous power available via PoE, the peak power requirement may exceed it.

Likewise, in an example embodiment where the battery-assisted PoE powered device 100 is a motor-actuated device, a motor may draw an in-rush current such that it has a momentary power requirement that exceeds the amount of power available via PoE. As a general rule, the power requirement at inrush may be several times larger than the steady state power requirement. While the steady state power requirement may be below the amount of continuous power available via PoE, the power requirement at inrush may exceed it.

Further, a variety of battery-assisted PoE powered devices 100 (including powered speakers, motor-actuated devices, and others) may typically be operated only intermittently. For example, in an example embodiment where the battery-assisted PoE powered device 100 is a powered speaker, the speaker may be used in an application where the built-in amplifier is typically only operated for a limited period of time (e.g., 5 minutes, 1 hour, etc.). The rest of the time it may be idle. Likewise, in an example embodiment where the battery-assisted PoE powered device 100 is a motor-actuated device the device may be used in an application where the motor is typically is only operate briefly (e.g., for 10 seconds, 1 minute, etc.) to perform a certain task. Again, for the rest of the time it may be idle. During periods of operation, the device load 140 may have a power requirement that exceeds the amount of power available via PoE. However, there may be long periods where the device load 140 does not have, or has a negligible, power requirement.

The local battery pack 150 includes one or more cells, for example, lithium ion cells, or cells utilizing another battery chemistry. The cells may be selected to have a maximum discharge rate that accommodates the difference between the maximum power consumption of the device load 140 (e.g., the peak power requirement, inrush power requirement, operating power requirement, etc.) and the power available via PoE, and a capacity that accommodates a maximum desired run time of the device load 140 given its average draw rate from the local battery pack 150. Depending on the embodiment, the local battery pack 150 may be hard-wired, such that it is substantially a permanent part of the battery-assisted PoE powered device 100, or connected via one or more sockets or plugs, such that it is user-replaceable. In some cases, the local battery pack 150 may be located within a wall or ceiling cavity. For example, in an example embodiment where the battery-assisted PoE powered device 100 is an in-wall or in-ceiling powered speaker, the local battery pack 150 may be disposed internal to the speaker can within a wall or ceiling cavity.

The charger/path controller 130 is configured to control charging and discharging of the local battery pack 150, to provide a burst of power when needed by the device load 140. The charger/path controller 130 may be a programmable voltage and current controller with support for battery charging and power management. The charger/path controller 130 charges the local battery pack 150 during periods of time when the device load 140 consumes less power than the amount available via PoE. During periods of time when the device load 140 consumes less power than the amount available via PoE, the charger/path controller 130 drives the device load 140 with only power from PoE. During periods of time when the device load 140 demands more power than the amount of power available via PoE, the charger/path controller 130 drives the device load 150 with a combination of PoE and battery power from the local battery pack 150, balancing the amount of power drawn from the battery pack 150 as the power demand fluctuates.

While the local battery pack 150 is preferably sized to have sufficient capacity to support typical use cases, under atypical use it may become depleted. The charger/path controller 130 may monitor battery charge level and determine whether the level has reached one or more charge thresholds. In response to battery charge level having reached a charge threshold, the local battery pack 150 may throttle power consumption of the device load 140 such that it still provides functionality, but at a reduced level, or may deactivate the device load 140 completely. For instance, in an example embodiment where the battery-assisted PoE powered device 100 is a powered speaker, the charger/path controller 130 may adjust the volume of the built-in amplifier when a first "low battery" threshold is reached. Further, the charger/path controller 130 may deactivate the built-in amplifier entirely when a second "empty" threshold is reached, to prevent damage to the cells of the local battery pack 150. In an example embodiment where the battery-assisted PoE powered device 100 is a motor-actuated device, the charger/path controller 130 may simply deactivate the motor when a single charge threshold is reached, as it may not be possible or practical to throttle the motor (e.g., the motor may be incapable of performing its task at reduced power).

In some implementations, the charger/path controller 130 may also determine a state of health (SOH) (i.e. a measure of the battery pack's ability to store and deliver power in comparison to a new battery pack) of the local battery pack 150. In response to the SOH having reached a SOH threshold, the charger/path controller 130 may provide a signal that the local battery pack 150 should be replaced (e.g., in the case of user-replaceable local battery pack) or that the entire battery-assisted PoE powered device 100 should be replaced (e.g., in the case of a hard-wired local battery pack). The signal may be a local signal (e.g., a tone, indicator light, audio message, etc.) that is perceived by a user from the device itself, or a remote signal (e.g., a message sent the Ethernet cable) to a remote system controller or other remote device that provides a message to the user in its own user interface.

Figure 2:
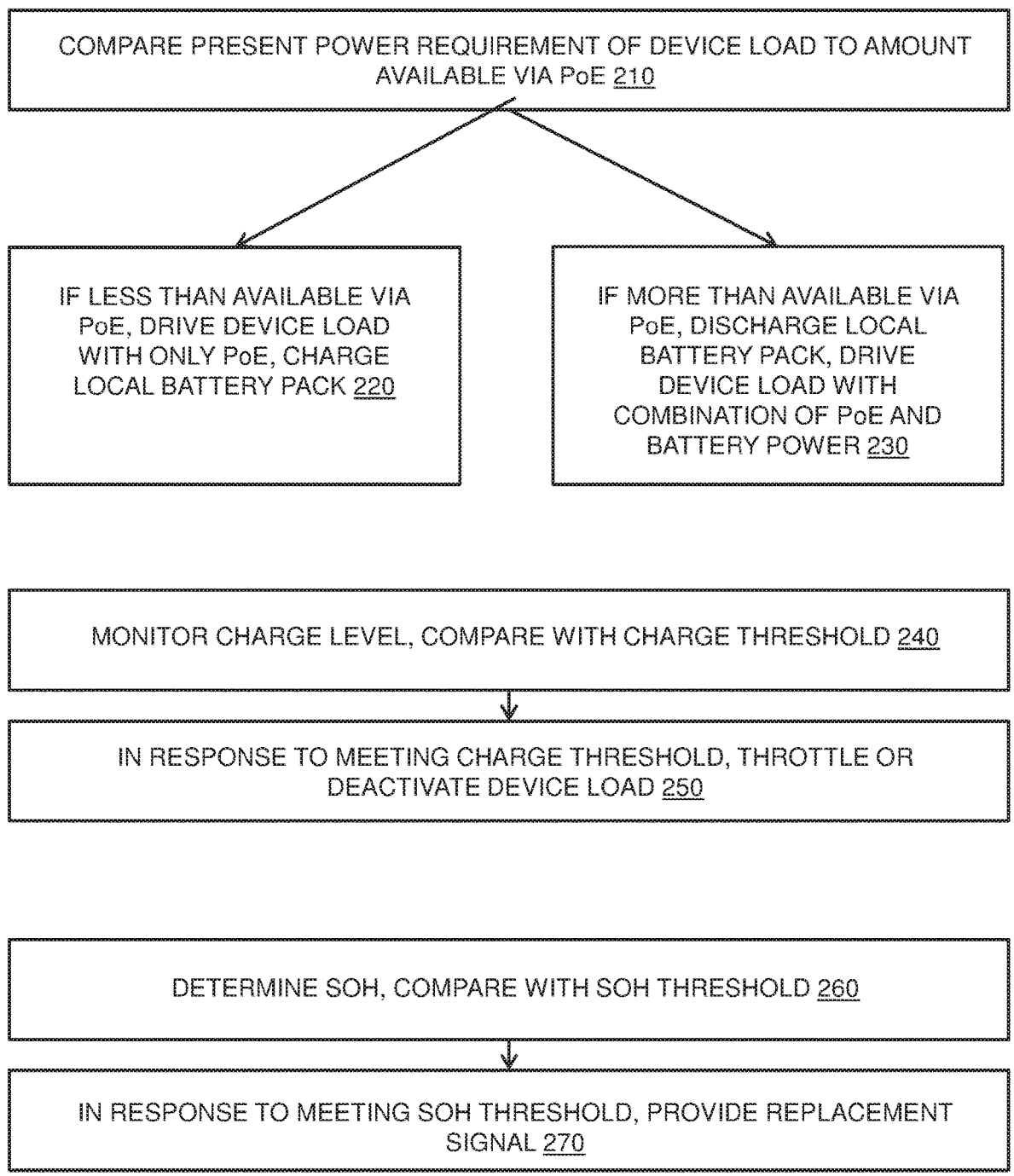
FIG. 2 is a flow diagram showing an example sequence of steps that summarize example operations of the battery-assisted PoE powered device of FIG. 1.

FIG. 2 is a flow diagram showing an example sequence of steps that summarize example operations of the battery-assisted PoE powered device 100. At step 210, the charger/path controller 130 compares a present power requirement of the device load 140 to an amount available via PoE. If the device load 140 requires less power than the amount available via PoE, at step 220, the charger/path controller 130 driving the device load with only power from PoE and charges the local battery pack 150 using the excess power. If the device load 140 requires more power than the amount available via PoE, at step 230, the charger/path controller 130 discharges the local battery pack 150 and drives the device load 140 with a combination of PoE and battery power. At step 240, which may occur simultaneously to steps 210-230, the charger/path controller 130 monitors battery charge level of the local battery pack 150 and compares it to a charge threshold (or multiple charge thresholds). In response to the battery charge level having reached the charge threshold (or a given charge threshold of multiple charge thresholds), at step 250, the charger/path controller 130 throttles power consumption of the device load 140 or deactivates the device load 140. At step 260, which again may occur simultaneously to steps 210-250, the charger/path controller 130 determines a SOH of the local battery pack 150 and compares it with a SOH threshold. In response to the SOH having reached the SOH threshold, at step 270, the charger/path controller 130 provides a replacement signal to a user.

It should be understood that a wide variety of adaptations and modifications may be made to the above described techniques, producing a number of alternative embodiments. In general, programmable functions may be implemented in software, hardware or various combinations thereof. Software implementations may include electronic device-executable instructions stored in a non-transitory electronic device-readable medium, such as a volatile memory, a persistent storage device, or other tangible medium. Hardware implementations may include programmable logic circuits, application specific integrated circuits, and/or other types of hardware components. Further, combined software/hardware implementations may execute some functionality using electronic device-executable instructions stored in a non-transitory electronic device-readable medium, and other functionality using hardware components. The above description should not be limited to one mode of construction or operation. Above all, it should be understood that the above description is meant to be taken only by way of example.

What is claimed is:

1. A battery-assisted Power-over-Ethernet (PoE) powered device, comprising:
   a port configured to receive an Ethernet cable via which PoE is provided according to a standard;
   a local battery pack including one or more cells;
   a device load configured to consume power to provide functionality of the battery-assisted PoE powered device, the consumed power to sometimes exceed an amount of power available via PoE according to the standard; and
   a charger/path controller configured to charge the local battery pack during periods of time when the device load consumes less power than the amount available via PoE according to the standard, and to discharge the local battery pack and to drive the device load with a combination of PoE and battery power from the local battery pack during periods of time when the device load demands more power than the amount of power available via PoE according to the standard.

2. The battery-assisted PoE powered device of claim 1, wherein the charger/path controller is further configured to drive the device load with only power from PoE during periods of time when the device load consumes less power than the amount available via PoE.

3. The battery-assisted PoE powered device of claim 1, further comprising:
   a PoE powered device controller configured to communicate via the port and Ethernet cable with power sourcing equipment (PSE) to arrange provision of PoE power according to the standard.

4. The battery-assisted PoE powered device of claim 1, wherein the standard is Institute of Electrical and Electronic Engineers (IEEE) 802.3bt.

5. The battery-assisted PoE powered device of claim 4, wherein the amount of power available via PoE according to the standard is 71 watts (W) guaranteed continuous power, and the consumed power of the device load sometimes exceeds the 71 W guaranteed continuous power.

6. The battery-assisted PoE powered device of claim 1, wherein the charger/path controller is further configured to:
monitor battery charge level of the local battery pack and compare the battery charge level to a charge threshold; and
in response to battery charge level having reached the charge threshold, throttle power consumption of the device load or deactivate the device load.

7. The battery-assisted PoE powered device of claim 1, wherein the charger/path controller is further configured to:
determine a state of health (SOH) of the local battery pack, wherein the SOH represents a measure of the local battery pack's ability to store and deliver power in comparison to a new local battery pack, and compare the SOH with a SOH threshold; and
in response to the SOH having reached the SOH threshold, provide a signal to a user.

8. The battery-assisted PoE powered device of claim 1, wherein the local battery pack is user-replaceable.

9. The battery-assisted PoE powered device of claim 1, wherein the powered device is an audio device, a video device or a home automation device.

10. The battery-assisted PoE powered device of claim 1, wherein the battery-assisted PoE powered device is a powered speaker and the device load includes one or more built-in amplifiers.

11. The battery-assisted PoE powered device of claim 10, wherein the powered speaker is an in-wall or in-ceiling powered speaker, and the local battery pack is disposed in a wall or ceiling cavity of a structure.

12. The battery-assisted PoE powered device of claim 10, wherein the periods of time when the device load demands more power than the amount of power available via PoE are periods of time of peak power coinciding with highs in an audio waveform of audio played by the powered speaker.

13. The battery-assisted PoE powered device of claim 1, wherein the battery-assisted PoE powered device is a motor-actuated device the device load includes a motor.

14. A method for battery-assisted Power-over-Ethernet (PoE) operation of a powered device, comprising:
comparing a present power requirement of a device load of the battery-assisted PoE powered device to an amount of power available via PoE according to a standard;
in response to the device load requiring less power than the amount available via PoE according to the standard, driving the device load with only power from PoE, and charging a local battery pack using excess power; and
in response to the device load requiring more power than the amount available via PoE according to the standard, ii discharging the local battery pack, and
driving the device load with a combination of PoE and battery power.

15. The method of claim 14, wherein the amount of power available via PoE according to the standard is 71 watts (W) guaranteed continuous power, and the discharging the local battery pack and driving the device load is in response to the device load requiring more than 71 W guaranteed continuous power.

16. The method of claim 14, further comprising:
monitoring battery charge level of the local battery pack and comparing battery charge level to a charge threshold; and
in response to the battery charge level having reached the charge threshold, throttling power consumption of the device load or deactivating the device load.

17. The method of claim 14, further comprising:
determining a state of health (SOH) of the local battery pack, wherein the SOH represents a measure of the local battery pack's ability to store and deliver power in comparison to a new local battery pack, and comparing the SOH to a SOH threshold; and
in response to the SOH having reached the SOH threshold, providing a signal to a user.

18. The method of claim 14, wherein the battery-assisted PoE powered device is a powered speaker and the device load includes one or more built-in amplifiers.

19. The method of claim 18, wherein the powered speaker is an in-wall or in-ceiling powered speaker and the local battery pack is disposed in a wall or ceiling cavity of a structure.

20. The method of claim 18, wherein the device load requires more power than the amount available via PoE at times coinciding with highs in an audio waveform being played by the powered speaker.

21. An in-wall or in-ceiling battery-assisted Power-over-Ethernet (PoE) powered device, comprising:
a port configured to receive an Ethernet cable via which PoE is provided according to a standard;
a local battery pack including one or more cells that is configured to be disposed in a wall or ceiling cavity of a structure;
a device load configured to be disposed in a wall or ceiling cavity of the structure and to consume power to provide functionality of the in-wall or in-ceiling device, the consumed power to sometimes exceed an amount of power available via PoE according to the standard; and
a charger/path controller configured to charge the local battery pack during periods of time when the device load consumes less power than the amount available via PoE according to the standard, and to discharge the local battery pack and to drive the device load with a combination of PoE and battery power from the local battery pack during periods of time when the device load demands more power than the amount of power available via PoE according to the standard.

22. The in-wall or in-ceiling battery-assisted PoE powered device of claim 21, wherein the charger/path controller is further configured to drive the device load with only power from PoE during periods of time when the device load consumes less power than the amount available via PoE.

23. The in-wall or in-ceiling battery-assisted PoE powered device of claim 21, wherein the charger/path controller is further configured to:
monitor battery charge level of the local battery pack and compare the battery charge level to a charge threshold; and
in response to battery charge level having reached the charge threshold, throttle power consumption of the device load or deactivate the device load.

24. The in-wall or in-ceiling battery-assisted PoE powered device of claim 1, wherein the in-wall or in-ceiling battery-assisted PoE powered device is a powered speaker and the device load includes one or more built-in amplifiers.

25. The in-wall or in-ceiling battery-assisted PoE powered device of claim 24, wherein the periods of time when the device load demands more power than the amount of power available via PoE are periods of time of peak power coinciding with highs in an audio waveform of audio played by the powered speaker.

\* \* \* \* \*

UNITED STATES PATENT AND TRADEMARK OFFICE
CERTIFICATE OF CORRECTION

PATENT NO. : 10,862,712 B1
APPLICATION NO. : 16/442987
DATED : December 8, 2020
INVENTOR(S) : Cary L. Christie Page 1 of 1

It is certified that error appears in the above-identified patent and that said Letters Patent is hereby corrected as shown below:

In the Claims

Claim 14:
Column 7, Line 55:
"ii discharging the local battery pack, and"
Should read:
-- discharging the local battery pack, and --

Signed and Sealed this
Sixth Day of May, 2025

Coke Morgan Stewart
*Acting Director of the United States Patent and Trademark Office*